United States Patent [19]

Seto

[11] Patent Number: 4,849,888
[45] Date of Patent: Jul. 18, 1989

[54] METHOD AND APPARATUS FOR EVALUATING A FEELING OF A GEAR SHIFTING OPERATION IN A MANUAL TRANSMISSION

[75] Inventor: Noriyuki Seto, Kure, Japan

[73] Assignee: Mazda Motor Corporation, Hiroshima, Japan

[21] Appl. No.: 166,547

[22] Filed: Mar. 10, 1988

[30] Foreign Application Priority Data

| Mar. 10, 1987 | [JP] | Japan | 62/55070 |
| Mar. 13, 1987 | [JP] | Japan | 62/59433 |
| Mar. 13, 1987 | [JP] | Japan | 62/59434 |
| Mar. 13, 1987 | [JP] | Japan | 62/59435 |
| Mar. 13, 1987 | [JP] | Japan | 62/59436 |
| Mar. 23, 1987 | [JP] | Japan | 62/68461 |
| Apr. 6, 1987 | [JP] | Japan | 62/84061 |
| Feb. 24, 1988 | [JP] | Japan | 63/41389 |
| Feb. 24, 1988 | [JP] | Japan | 63/41390 |
| Feb. 24, 1988 | [JP] | Japan | 63/41391 |

[51] Int. Cl.$^4$ .................. G06F 15/46; G01L 5/22
[52] U.S. Cl. .................. 364/424.1; 364/551.01; 364/506
[58] Field of Search .......... 364/424.1, 551.01, 506; 318/628; 74/866, 339, 752 B, 752 D; 73/862.19, 862.31

[56] References Cited

U.S. PATENT DOCUMENTS

| 4,621,328 | 11/1986 | Arai et al. | 364/424.1 |
| 4,622,866 | 11/1986 | Ito et al. | 74/866 |
| 4,712,452 | 12/1987 | Hibino et al. | 74/866 |
| 4,752,883 | 6/1988 | Asakura et al. | 364/424.1 |

FOREIGN PATENT DOCUMENTS

| 55-20530 | 3/1980 | Japan . |
| 56-26569 | 6/1981 | Japan . |
| 56-28730 | 7/1981 | Japan . |
| 61-35501 | 8/1986 | Japan . |

Primary Examiner—Felix D. Gruber
Assistant Examiner—Christopher L. Makay
Attorney, Agent, or Firm—Gerald J. Ferguson, Jr.

[57] ABSTRACT

A method of evaluating a feeling of a gear shifting operation in a manual transmission provided with a gear shifting lever and a synchromesh device comprises the steps of causing the gear shifting lever to perform a shifting operation so as to put one of gear trains in the manual transmission into a power transmitting state through the synchromesh device, measuring at least load imposed on the gear shifting lever during a predetermined period within the shifting operation of the gear shifting lever, obtaining at least one calculated value based on data obtained by at least measurement of the load imposed on the gear shifting lever, and evaluating at least one of heaviness and smoothness of the shifting operation of the gear shifting lever on the strength of the calculated value.

19 Claims, 7 Drawing Sheets

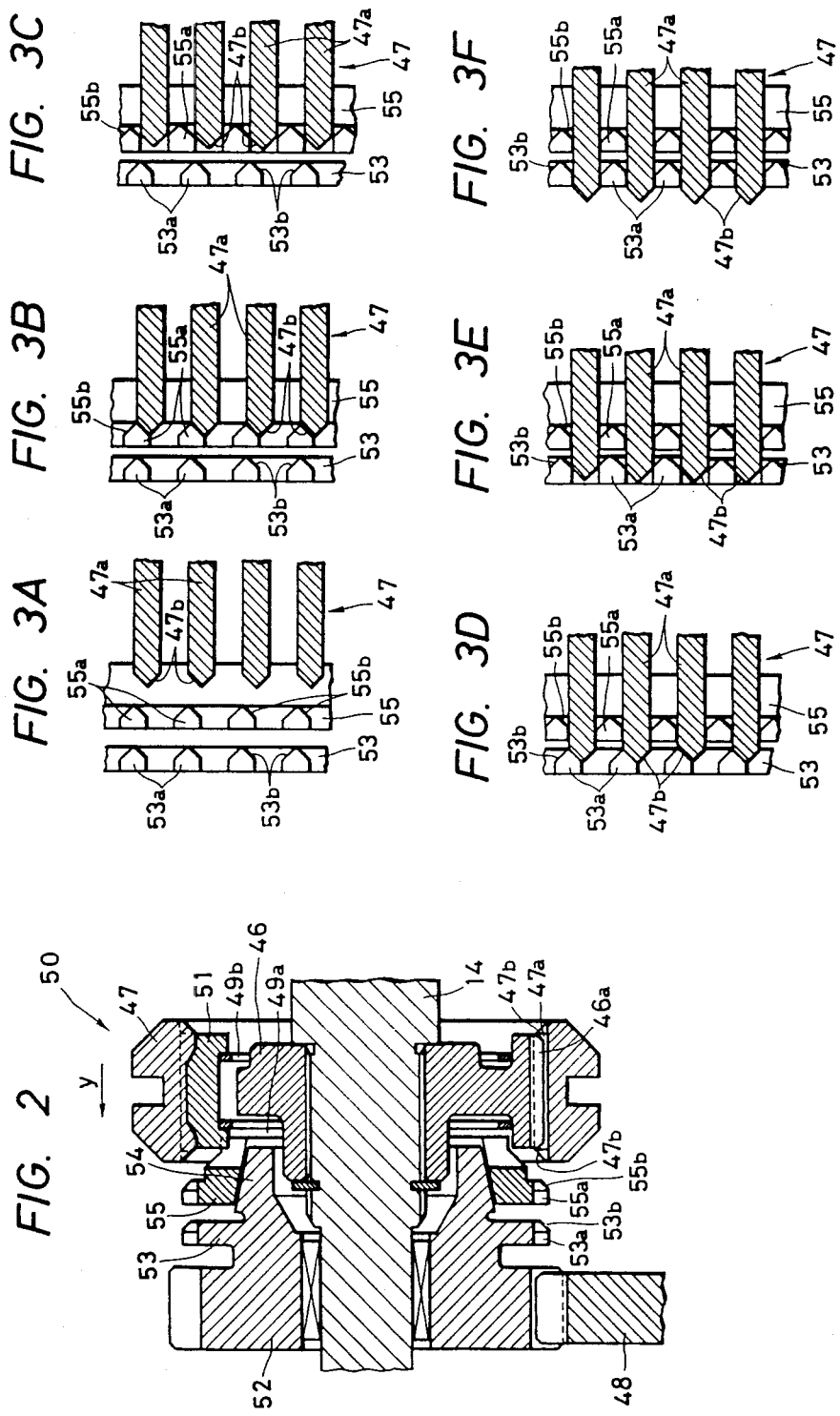

METHOD AND APPARATUS FOR EVALUATING A FEELING OF A GEAR SHIFTING OPERATION IN A MANUAL TRANSMISSION

BACKGROUND OF THE INVENTION

1. Field of the Invention

The present invention relates generally to a method of evaluating a feeling of a gear shifting operation in a manual transmission, and more particularly, to a method of evaluating quantitatively heaviness or smoothness of a shifting operation of a gear shifting lever provided to extend from a manual transmission for use in a vehicle.

2. Description of the Prior Art

As known conventionally, in a manual transmission provided with a gear shifting lever and used in a vehicle, an input shaft, a counter shaft disposed to be rotated by the input shaft and an output disposed in parallel with the counter shaft are contained, and a plurality of gear trains having different gear ratios respectively are arranged between the input shaft and the counter, and the counter shaft and the output shaft. The gear train between the input shaft and the counter shaft is operative to transmit the rotation of the input shaft to the counter shaft. Gears mounted on the output shaft to constitute partially the gear trains between the counter shaft and the output shaft are not fixed to the outer shaft but made rotatable freely at the outer shaft. When the gear shifting lever is manipulated, one of the gears mounted on the output shaft is caused to engage through a synchromesh device with the output shaft so that a speed corresponding to a gear ratio of the gear train which includes the gear engaged through synchromesh device with the output shaft is selected Further, in a condition where a particular speed is selected, the input shaft is engaged through another synchromesh device with the output shaft so that the rotation of the input shaft is transmitted directly to the output shaft.

The synchromesh device employed in the manual transmission comprises fundamentally a clutch hub engaged with the output shaft to be rotated thereby and provided thereon with external spline teeth, a synchronizing sleeve provided thereon internal spline teeth for engaging with the external spline teeth of the clutch hub, and a clutch gear incorporated with a gear to synchronize which is mounted to be rotatable freely on the output shaft or mounted fixedly on the input shaft and provided thereon with external spline teeth for engaging with the internal spline teeth of the synchronizing sleeve. In case of manipulation of the gear shifting lever, the synchronizing sleeve is moved along the output shaft to cause the internal spline teeth provided on the synchronizing sleeve to engage with both the external spline teeth provided on the clutch hub and the external spline teeth provided on the clutch gear, so that the rotation of the gear to synchronize is transmitted through the clutch gear, the synchronizing sleeve and clutch hub to the output shaft In such a synchromesh device, it is required that the gear to synchronize be mounted to be rotatable freely on the output shaft or mounted fixedly on the input shaft is synchronized in rotation with the synchronizing sleeve which rotates together with the output shaft in order that the internal spline teeth provided on the synchronizing sleeve can be engaged smoothly with the external spline teeth provided on the clutch gear. Therefore, in general, the synchromesh device further comprises a synchronizer ring having external spline teeth for engaging with the internal spline teeth provided on the synchronizing sleeve is provided between the synchronizing sleeve and the clutch gear, and a chamfer is formed at an end of each of the internal spline teeth provided on the synchronizing sleeve, the external teeth provided on the synchronizer ring, and the external teeth provided on the clutch gear, so that the internal spline teeth can thrust through easily and engage with the external teeth provided on the synchronizer ring or the external teeth provided on the clutch gear.

In the synchromesh device having the synchronizer ring, when the gear shifting lever is manipulated, the synchronizing sleeve is moved to the clutch gear and key members accompanying with the synchronizing sleeve push the synchronizer ring to move the same toward the clutch gear. The synchronizer ring moved to the clutch gear engages with a conical portion projecting from the gear to synchronize toward the synchronizing sleeve, so that the gear to synchronize is put into synchronism in rotation with the synchronizing sleeve, clutch hub and output shaft by frictional force acting between the synchronizer ring and the conical portion. Under a condition wherein the gear to synchronize is put into synchronism in rotation with the synchronizing sleeve, the internal spline teeth provided on the synchronizing sleeve thrust through the external spline teeth provided on the synchronizer ring to engage with the same. The synchronizing sleeve put into engagement with the synchronizer ring is further moved toward the clutch gear and the internal spline teeth provided on the synchronizing sleeve thrust through the external spline teeth provided on the clutch gear to engage with the same.

When the synchronizing operation is performed between the synchronizing sleeve and the clutch gear, the thrusting and engaging operation of the internal spline teeth provided on the synchronizing sleeve acting upon the external spline teeth provided on the synchronizer ring, and the thrusting and engaging operation of the internal spline teeth provided on the synchronizing sleeve acting upon the external spline teeth provided on the clutch gear are carried out successively as described above in the synchromesh device, load imposed on the gear shifting lever and moving speed of the gear shifting lever are varied with lapse of time. Such variations in the load imposed on the gear shifting lever and in the moving speed of the gear shifting lever exert a great influence upon a feeling of a gear shifting operation in the manual transmission, that is, heaviness, smoothness and sensory factors of a shifting operation of the gear shifting lever.

In manufacturing of manual transmissions, a prototype of the transmission is subjected to a test for evaluating a feeling of a gear shifting operation for the purpose of designing a manual transmission with which an operator obtains a superior feeling of the gear shifting operation at a step for developing manual transmissions, and each of newly produced manual transmissions is subjected also to a test for evaluating the feeling of the gear shifting operation at, for example, a final stage of an assembly line for the purpose of supplying manual transmissions with each of which an operator obtains a superior feeling of the gear shifting operation at a step for producing manual transmissions. However, since the test for evaluating the feeling of the gear shifting operation relies conventionally upon sense of an operator who actually manipulates a gear shifting lever of the manual transmission, different results of evaluation may be derived from the same manual transmission by different operators, respectively.

Therefore, at the step for developing manual transmissions, it is required that a large number of tests for evaluating the feeling of the gear shifting operation are conducted repeatedly on prototypes assembled with different parts for finding out the most appropriate specification for each type of manual transmissions and this results disadvantageously in many man-hours and a large amount of expense. Further, at the step for producing manual transmissions, the test relying upon sense of an operator results in a problem that it is difficult to supply manual transmissions made uniform in quality.

OBJECTS AND SUMMARY OF THE INVENTION

Accordingly, it is an object of the present invention to provide an improved method of evaluating a feeling of a gear shifting operation in a manual transmission, which avoids the aforementioned disadvantages and problems encountered with the prior art.

Another object of the present invention is to provide a method of evaluating a feeling of a gear shifting operation in a manual transmission provided with a gear shifting lever, through which heaviness of a shifting operation of the gear shifting lever can be evaluated appropriately and quantitatively without relying upon sense of an operator.

A further object of the present invention is to provide a method of evaluating a feeling of a gear shifting operation in a manual transmission provided with a gear shifting lever, through which smoothness of a shifting operation of the gear shifting lever can be evaluated appropriately and quantitatively without relying upon sense of an operator A still further object of the present invention is to provide an apparatus for evaluating a feeling of a gear shifting operation in a manual transmission provided with a gear shifting lever, by which both heaviness and smoothness of a shifting operation of the gear shifting lever can be evaluated appropriately and quantitatively.

According to the present invention, there is provided a method of evaluating a feeling of a gear shifting operation in a manual transmission which is provided with a gear shifting lever and a synchromesh device including a synchronizing sleeve, a synchronizer ring and a clutch gear incorporated with a gear to synchronize and operates in response to a shifting operation of the gear shifting lever, which comprises the steps of causing the gear shifting lever to perform the shifting operation so as to put one of gear trains in the manual transmission into a power transmitting state through the synchromesh device, measuring at least load imposed on the gear shifting lever during a predetermined period within the shifting operation of the gear shifting lever, obtaining a calculated value based on data obtained by measurement of the load imposed on the gear shifting lever, and evaluating at least one of heaviness and smoothness of the shifting operation of the gear shifting lever on the strength of the calculated value.

In a first embodiment of method according to the present invention, the load imposed on the gear shifting lever is measured during at least one of a first period from a first time point at which chamfers of spline teeth provided on the synchronizing sleeve commence to engage with chamfers of spline teeth provided on the synchronizer ring to a second time point at which the clutch gear is thoroughly synchronized in rotation through the synchronizer ring with the synchronizing sleeve, a second period from the second time point to a third time point at which the spline teeth provided on the synchronizing sleeve complete to thrust through the spline teeth provided on the synchronizer ring, and a third period from the first time point to the third time point; impulse acting upon the gear shifting lever during one of the first, second and third periods, or impulse acting upon the gear shifting lever during each of two or the whole of the first, second and third periods is calculated based on data obtained by measurement of the load imposed on the gear shifting lever; and the heaviness of the shifting operation of the gear shifting lever is evaluated on the strength of the calculated impulse.

In a second embodiment of method according to the present invention, the load imposed on the gear shifting lever and a moving distance of the gear shifting lever are measured during a period from a time point at which chamfers of spline teeth provided on the synchronizing sleeve commence to engage with chamfers of spline teeth provided on the synchronizer ring to a time point at which the spline teeth provided on the synchronizing sleeve complete to thrust through the spline teeth provided on the synchronizer ring; work load acting upon the gear shifting lever is calculated based on data obtained by measurement of the load imposed on the gear shifting lever and the moving distance of the gear shifting lever; and the heaviness of the shifting operation of the gear shifting lever is evaluated on the strength of the calculated work load.

In a third embodiment of method according to the present invention, the load imposed on the gear shifting lever is measured during a period from a time point at which chamfers of spline teeth provided on the synchronizing sleeve commence to engage with chamfers formed respectively on spline teeth provided on the clutch gear to a time point at which the spline teeth provided on the synchronizing sleeve complete to thrust through the spline teeth provided on the clutch gear after the spline teeth provided on the synchronizing sleeve has completed to thrust through the spline teeth provided on the synchronizer ring; impulse acting upon the gear shifting lever is calculated based on data obtained by measurement of the load imposed on the gear shifting lever; and the smoothness of the shifting operation of the gear shifting lever is evaluated on the strength of the calculated impulse.

In a fourth embodiment of method according to the present invention, the load imposed on the gear shifting lever and a moving distance of the gear shifting lever are measured during a period from a time point at which chamfers of spline teeth provided on the synchronizing sleeve commence to engage with chamfers of spline teeth provided on the clutch gear to a time point at which the spline teeth provided on the synchronizing sleeve complete to thrust through the spline teeth provided on the clutch gear after the spline teeth provided on the synchronizing sleeve has completed to thrust through the spline teeth provided on the synchronizer ring; work load acting upon the gear shifting lever is calculated based on data obtained by measurement of the load imposed on the gear shifting lever and the moving distance of the gear shifting lever; and the smoothness of the shifting operation of the gear shifting lever is evaluated on the strength of the calculated work load.

In a fifth embodiment of method according to the present invention, the load imposed on the gear shifting lever is measured during a period from a time point at which chamfers of spline teeth provided on the synchronizing sleeve commence to engage with chamfers of spline teeth provided on the clutch gear to a time point at which the spline teeth provided on the synchronizing sleeve complete to thrust through the spline teeth provided on the clutch gear after the spline teeth provided on the synchronizing sleeve has completed to thrust through the spline teeth provided on the synchronizer ring; a positive ratio of change of the load imposed on the gear shifting lever is calculated based on data obtained by measurement of the load imposed on the gear shifting lever; and the smoothness of the shifting operation of the gear shifting lever is evaluated on the strength of the calculated positive ratio of change of the load imposed on the gear shifting lever.

In a sixth embodiment of method according to the present invention, the load imposed on the gear shifting lever is measured during a first period from a first time point at which chamfers of spline teeth provided on the synchronizing sleeve commence to engage with chamfers of spline teeth provided on the synchronizer ring to a second time period at which the chamfers of the spline teeth provided on the synchronizing sleeve complete to thrust through the chamfers of the spline teeth provided on the synchronizer ring, during a second period from the second time point to a third time point at which the chamfers on the spline teeth provided on the synchronizing sleeve commence to engage with chamfers respectively on spline teeth provided on the clutch gear, and during a third period from the third time point to a fourth time point at which the chamfers of the spline teeth provided on the synchronizing sleeve complete to thrust through the chamfers of on the spline teeth provided on the clutch gear; a value in accordance with a predetermined numerical expression is calculated based on a maximum value of the load measured during the first period, a minimum value of the load measured during the second period and a maximum value of the load measured during the third period; and the smoothness of the shifting operation of the gear shifting lever is evaluated on the strength of the calculated value.

In a seventh embodiment of method according to the present invention, the load imposed on the gear shifting lever and an output torque of the manual transmission are measured during a period from a time point at which chamfers of spline teeth provided on the synchronizing sleeve commence to engage with chamfers of spline teeth provided on the synchronizer ring to a time point at which the gear to synchronize is thoroughly synchronized in rotation with the synchronizing sleeve through the synchronizer ring engaging frictionally with the gear to synchronize; friction coefficient between the synchronizer ring and the gear to synchronize is calculated based on data obtained by measurement of the load imposed on the gear shift lever and the output torque of the manual transmission; and a synchronizing performance of the synchromesh device and the heaviness or smoothness of the shifting operation of the gear shifting lever are evaluated on the strength of the calculated friction coefficient.

In an eighth embodiment of method according to the present invention, speed differences between the rotation speed of the gear to synchronize and the rotation speed of an output shaft of the manual transmission arising respectively in a plurality of predetermined period within the shifting operation of the gear shifting lever are detected, and a synchronizing performance of the synchromesh device and the heaviness or smoothness of the shifting operation of the gear shifting lever are evaluated on the strength of the detected speed differences.

Further, according to the present invention, there is provided an apparatus for evaluating a feeling of a gear shifting operation in a manual transmission which is provided with a gear shifting lever and a synchromesh device, which comprises a driving device for rotating an input shaft of the manual transmission, a shifting device for moving the gear shifting lever to perform the shifting operation, an operation detector for detecting the operating state of the gear shifting lever moved by the shifting device, and a calculating device for calculating a value representing quantitatively the feeling of the gear shifting operation in the manual transmission based on detection outputs obtained from the operation detector.

With the method carried out as mentioned above according to the present invention, the heaviness or smoothness of the shifting operation of the gear shifting lever is evaluated quantitatively with uniformity in such a manner as to fit appropriately to an actual feeling of the gear shifting operation in the manual transmission, without relying upon sense of an operator. Consequently, in manufacturing manual transmissions, the method according to the present invention contributes to realizing a superior design of the manual transmission at the step for developing manual transmission in manufacturing manual transmissions and also to making newly produced manual transmissions uniform in quality at the step for producing manual transmissions.

Such method according to the present invention is put into practice effectively with use of the apparatus constituted as described above in accordance with the present invention.

The above, and other objects, features and advantages of the present invention will become apparent from the following detailed description which is to be read in conjunction with the accompanying drawings.

BRIEF DESCRIPTION OF THE DRAWINGS

FIG. 2 is a schematic cross-sectional view showing a synchromesh device employed in a manual transmission which is subjected to an evaluation conducted through the method according to the present invention;

FIGS. 3A to 3F are schematic illustrations used for explaining the operation of the synchromesh device shown in FIG. 2;

DESCRIPTION OF THE PREFERRED EMBODIMENTS

Figure 1:
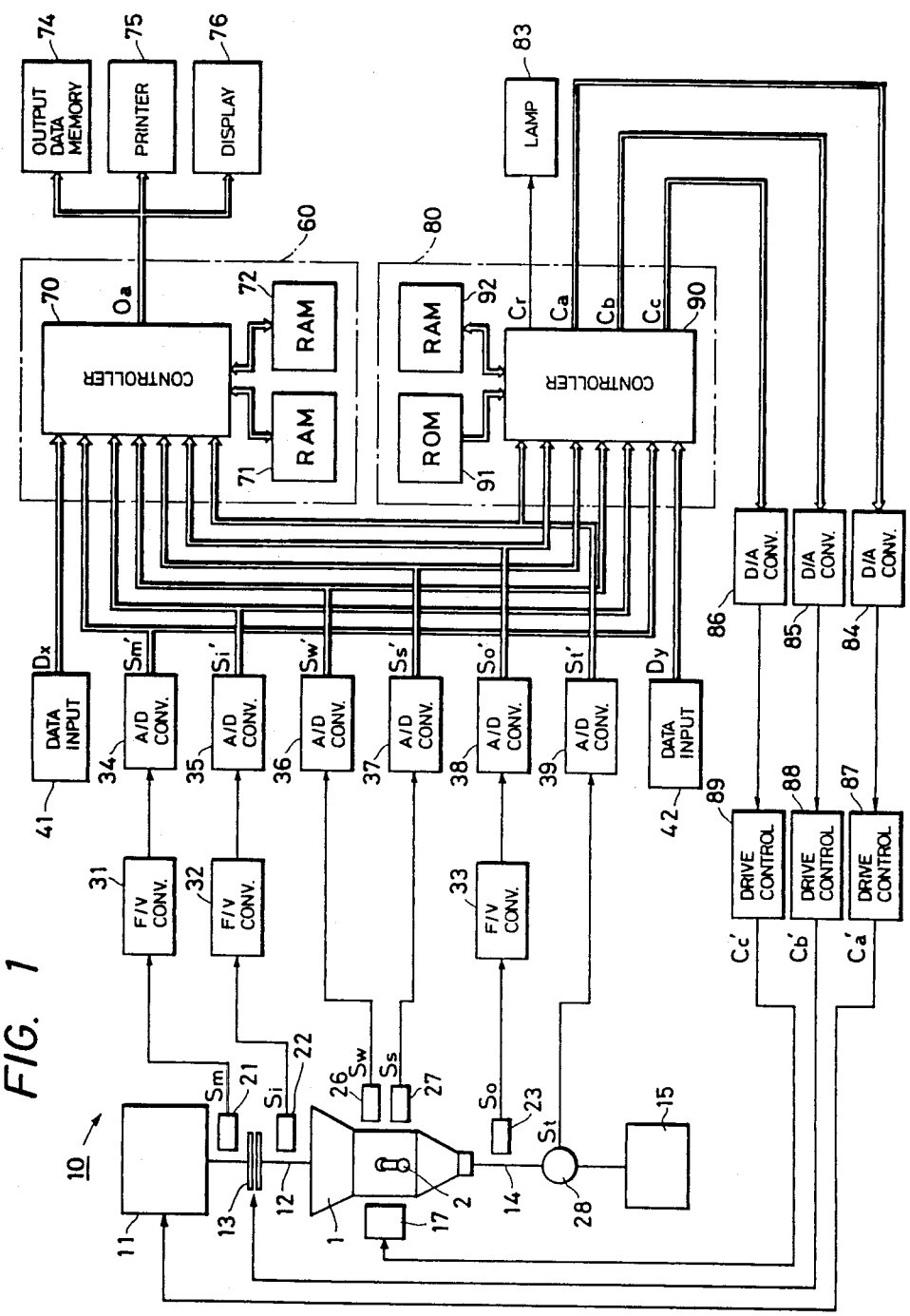
FIG. 1 is a schematic block diagram showing an example of an apparatus used for carrying out a method of evaluating a feeling of a gear shifting operation in a manual transmission according to the present invention.

FIG. 1 shows schematically an example of a testing apparatus used for carrying out the method of evaluating a feeling of a gear shifting operation in a manual transmission according to the present invention and a manual transmission set on the apparatus to be subjected to evaluation.

A testing apparatus 10 which constitutes one example of the testing apparatus used for carrying out the method according to the present invention comprises a motor 11 for rotating a manual transmission 1 set on the testing apparatus 10, a clutch device 13 provided on an input shaft 12 of the manual transmission 1, a flywheel 15 provided on an output shaft 14 of the manual transmission 1 to give the same inertial mass corresponding to a vehicle body on which the manual transmission 1 is to be mounted, and an actuator 17 for moving a gear shifting lever 2 provided to extend from the manual transmission 1 to have a shifting operation for changing speed in the manual transmission 1. Further, the testing apparatus 10 is provided with a motor rotation sensor 21 for detecting the rotation of the motor 11 and producing a detection output signal Sm representing the detected rotation, an input shaft rotation sensor 22 for detecting the rotation of the input shaft 12 and producing a detection output signal Si representing the detected rotation, an output shaft rotation sensor 23 for detecting the rotation of the output shaft 14 and producing a detection output signal So representing the detected rotation, a load sensor 26 for detecting load imposed on the gear shifting lever 2 and producing a detection output signal Sw representing the detected load, a distance sensor 27 for detecting a moving distance of the gear shifting lever 2 and producing a detection output signal Ss representing the detected moving distance, and a torque sensor 28 for detecting an output torque of the manual transmission 1 and producing a detection output signal St representing the detected output torque.

The detection output signals Sm, Si and So obtained from the motor rotation sensor 21, input shaft rotation sensor 22 and output shaft rotation sensor 23, respectively, are converted to voltage signals by frequency-voltage converters (F/V converters) 31, 32 and 33, and then further converted to digital signals Sm', Si' and So' by analog to digital converters (A/D converters) 34, 35 and 38, respectively. The digital signals Sm', Si' and So' are supplied to both a controller 70 contained in a data processing unit 60 and a controller 90 contained in a drive control unit 80. The detecting output signals Sw, Ss and St obtained from the load sensor 26, distance sensor 27 and torque sensor 28 are converted to digital signals Sw', Ss' and St' by D/A converters 36, 37 and 39, respectively, and the digital signals Sw', Ss' and St' are also supplied to both the controllers 70 and 90.

The controller 70 in the data processing unit 60 and the controller 90 in the drive control unit 80 are further supplied respectively with input data Dx and Dy from data input portions 41 and 42 each constituted by, for example, a keyboard. The data processing unit 60 contains, in addition to the controller 70, a random access memory (RAM) 71 in which an operation program for data processing in the controller 70 is written and from which the operation program written therein is read, and a RAM 72 for storing temporarily the data processed by the controller 70. An output data signal Oa from the data processing unit 60 is supplied to an output data memory 74, a printer 75 and a display device 76. Further, the drive control unit 80 contains, in addition to the controller 90, a read only memory (ROM) 91 from which an operation program for data processing in the controller 90 is read, and a RAM 92 for storing temporarily the data processed by the controller 90. From the drive control unit 80, a lamp driving signal Cr is supplied to a lamp 83 and digital control signals Ca, Cb and Cc are supplier to digital to analog converters (D/A converters) 84, 85 and 86, respectively.

The digital control signals Ca, Cb and Cc are converted to analog control signals at the D/A converters 84, 85 and 86 to supplied to drive control circuits 87, 88 and 89, respectively. The drive control circuit 87 produces a driving signal Ca' based on the analog control signal from the D/A converter 84 and supplies the same to the motor 11, the drive control circuit 88 produces a driving signal Cb' based on the analog control signal from the D/A converter 85 and supplies the same to the clutch device 13, and the drive control circuit 89 produces a driving signal Cc' based on the analog control signal from the D/A converter 86 and supplies the same to the actuator 17, so that the motor 11, clutch device 13 and actuator 17 are driven in response to the digital control signals Ca, Cb and Cc, respectively.

In the manual transmission 1, for example, one of four forward speeds and one reverse speed is selected in response to the shifting operation of the gear shifting lever 2, and speed change is carried out through a synchromesh device 50 employed in the manual transmission 1 with such a configuration as shown in FIG. 2.

The synchromesh device 50 shown in FIG. 2 comprises a clutch hub 46 engaged with the output shaft 14 of the manual transmission 1 to be rotated thereby and provided thereon with external spline teeth 46a, a synchronizing sleeve 47 provided thereon internal spline teeth 47a for engaging with the external spline teeth 46a of the clutch hub 46 and disposed around the clutch hub 46 to be movable along the output shaft 14, a plurality of key members 51 provided on a peripheral portion of the clutch hub 46 to be pressed against the synchronizing sleeve 47 by ring-shaped springs 49a and 49b, a clutch gear 53 incorporated with a gear 52 to synchronize, which is mounted to be rotatable freely on the output shaft 14 and engaging with a gear 48 which is fixed on a counter shaft disposed in parallel to the output shaft 14 and engaged through a gear train with the input shaft 12 to be rotated, and provided thereon with external spline teeth 53a for engaging with the internal spline teeth 47a provided on the synchronizing sleeve 47, a conical portion 54 incorporated with the gear 52 to project therefrom to the clutch hub 46, and a synchronizer ring 55 provided with a conical inner surface for engaging frictionally with the conical portion 54 and external spline teeth 55a for engaging with the internal spline teeth 47a provided on the synchronizing sleeve 47.

Each of the internal spline teeth 47a provided on the synchronizing sleeve 47 has chamfers 47b at both ends in the direction along the output shaft 14, and each of the external spline teeth 53a provided on the clutch gear 53 and each of the external spline teeth 55a provided on the synchronizer ring 55 have respectively chamfers 53b and 55b facing the chamfers 47b at respective ends opposite to the clutch hub 46.

In the synchromesh device 50 thus constituted, when the gear shifting lever 2 is moved to perform a shifting operation for, for example, shifting-up, the gear 52 to synchronize is coupled with the output shaft 14 to rotate together through such operations of the synchromesh device 50 carried out successively as shown in FIGS. 3A to 3F. During this shifting operation of the gear shifting lever 2, load L imposed on the gear shifting lever 2, moving distance K of the gear shifting lever 2, rotating speed N of the gear 52 to synchronize, and output torque U of the output shaft 14 vary as shown in FIGS. 4A, 4B, 4C and 4D, respectively.

In the case where the shifting operation of the gear shifting lever 2 commences at a time point $t_0$ shown in FIGS. 4A to 4D, the synchronizing sleeve 47 is moved in accordance with the movement of the gear shifting lever 2 in a direction shown by an arrow y in FIG. 2 (y direction). When the synchronizing sleeve 47 is moved from a neutral position shown in FIG. 2, where the internal spline teeth 47a provided on the synchronizing sleeve 47 is in the condition shown in FIG. 3A, toward the clutch gear 53 by a distance $K_1$ in the moving distance K shown in FIG. 4B, the key members 51 push the synchronizer ring 55 toward the gear 52 in the y direction. The conical inner surface of the synchronizer ring 55 pushed by the key members 51 is pressed against the conical portion 54 and, as shown in FIG. 3B, the chamfers 47b of the internal spline teeth 47a provided on the synchronizing sleeve 47 commence to engage with the chamfers 55b of the external spline teeth 55a provided on the synchronizer ring 55 at a time point $t_1$ shown in FIGS. 4A to 4D, so that a synchronizing operation starts between the synchronizing sleeve 47 and the gear 52 to synchronize.

Figure 4A:
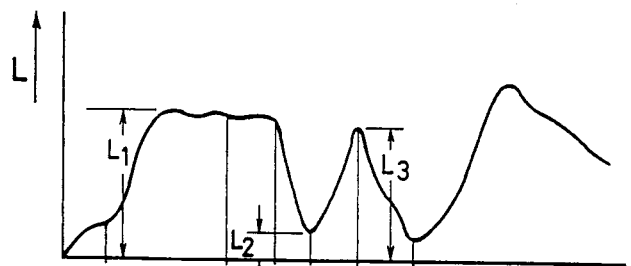
FIGS. 4A to 4D are time charts used for explaining the operation of the synchromesh device shown in FIG. 2.
Figure 4B:
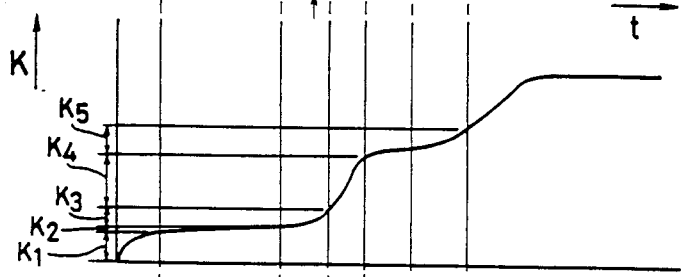
Figure 4C:
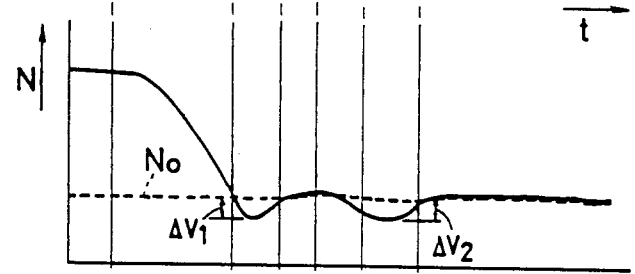

At the time point $t_1$, there is difference between the rotating speed N of the gear 52 and rotating speed No of the output shaft 14 as shown in FIG. 4C and therefore the conical inner surface of the synchronizer ring 55 slips on the conical portion 54 so that a friction force which corresponds to an external force acting upon the gear shifting lever 2 to move the same in the y direction arises between the synchronizer ring 55 and the conical portion 54. The gear 52 is synchronized in rotation with the synchronizer ring 55 by means of the friction force between the synchronizer ring 55 and the conical portion 54 and also synchronized in rotation through the synchronizer ring 55 with the synchronizing sleeve 47 rotating together with the output shaft 14, so that the rotating speed N of the gear 52 coincides with the rotating speed No of the output shaft 14 at a time point $t_2$ as shown in FIG. 4C. The time points $t_1$ and $t_2$ define a synchronizing operation period Ta shown in FIGS. 4A and 4D, and during such a synchronizing operation period Ta from the time point $t_1$ to the time point $t_2$, the moving distance K of the gear shifting lever 2 becomes a very short distance $K_2$ as shown in FIG. 4B and the load L imposed on the gear shifting lever 2 is made relatively large due to the friction force arising between the synchronizer ring 55 and the conical portion 54.

Further, the output torque U corresponding to total inertial mass of the gear 52 and rotating parts driven by the gear 52 arises on the output shaft 14.

When the synchronizing operation is completed between the synchronizing sleeve 47 and the gear 52, a thrusting operation of the internal spline teeth 47a provided on the synchronizing sleeve 47 to the external spline teeth 55a provided on the synchronizer ring 55 is commenced by a force given by the gear shifting lever 2 to act upon the synchronizing sleeve 47 in the y direction. In this thrusting operation, the synchronizing sleeve 47 is moved in the y direction from a position where the chamfers 47b of the internal spline teeth 47a provided on the synchronizing sleeve 47 engages with the chamfers 55b of the external spline teeth 55a provided on the synchronizer ring 55 as shown in FIG. 3B by a distance corresponding to a distance $K_3$ in the moving distance K of the gear shifting lever 2 shown in FIG. 4B, so that the synchronizer ring 55 is rotated by a predetermined angle relatively to the synchronizing sleeve 47. On this occasion, the synchronizer ring 55 rotates together with the gear 52 and therefore a speed difference $\Delta V_1$ arises between the rotating speed N of the gear 52 and the rotating speed No of the output shaft 14, as shown in FIG. 4C.

Then, at a time point $t_3$ shown in FIGS. 4A to 4D, the internal spline teeth 47a provided on the synchronizing sleeve 47 has thrust through the external spline teeth 55a provided on the synchronizer ring 55 to engage with the same as shown in FIG. 3C and therefore the thrusting operation of the internal spline teeth 47a provided on the synchronizing sleeve 47 to the external spline teeth 55a provided on the synchronizer ring 55 is completed. The time points $t_2$ and $t_3$ define a thrusting operation period Tb shown in FIGS. 4A and 4D, and during such a thrusting operation period Tb from the time point $t_2$ to the time point $t_3$, the load L imposed on the gear shifting lever 2 is made relatively large as shown in FIG. 4A because the synchronizing sleeve 47 is operative to rotate both the synchronizer ring 55 and the gear 52 relatively to the synchronizing sleeve 47.

After that, the synchronizing sleeve 47 is moved in the y direction to cause the internal spline teeth 47a provided thereon to engage thoroughly with the external spline teeth 55a provided on the synchronizer ring 55. On this occasion, since resistance against the movement of the synchronizing sleeve 47 in the y direction is reduced, the load L imposed on the gear shifting lever 2 is suddenly decreased as shown in FIG. 4A.

When the synchronizing sleeve 47 is moved by a distance corresponding to a distance $K_4$ in the moving distance K of the gear shifting lever 2 shown in FIG. 4B after the time point $t_3$, the load L imposed on the gear shifting lever 2 takes its minimum value at a time point $t_4$ shown in FIGS. 4A to 4D as shown in FIG. 4A and the chamfers 47b of the internal spline teeth 47a provided on the synchronizing sleeve 47 engage with the chamfers 53b of the external spline teeth 53a provided on the clutch gear 53 as shown in FIG. 3D at the time point $t_4$. The time points $t_3$ and $t_4$ define a meshing operation period Tc shown in FIGS. 4A to 4D, and during such a meshing operation period Tc from the time point $t_3$ to the time point $t_4$, the synchronizing sleeve 47 completes to mesh the synchronizer ring 55 and a thrusting operation of the internal spline teeth 47a provided on the synchronizing sleeve 47 to the external spline teeth 53a provided on the clutch gear 53 commences at the time point $t_4$. In this thrusting operation, the clutch gear 53 and the gear 52 are rotated relatively to the synchronizing sleeve 47 and the synchronizer ring 55 in opposition to the friction force between the synchronizer ring 55 and the conical portion 54 and therefore the load L imposed on the gear shifting lever 2 is increased again after the time point $t_4$, as shown in FIG. 4A. Then, the synchronizer ring 55 is rotated relatively to the conical portion 54, so that the synchronizing sleeve 47 commences to rotate relatively to the gear 52, and the load L imposed on the gear shifting lever 2 reaches its maximum value at a time point $t_5$ as shown in FIG. 4A. When the synchronizing sleeve 47 is moved by a distance corresponding to a distance $K_5$ in the moving distance K of the gear shifting lever 2 shown in FIG. 4B after the time point $t_4$, the internal spline teeth 47a provided on the synchronizing sleeve 47 engage with the external spline teeth 53a provided on the clutch gear 53 as shown in FIG. 3E at a time point $t_6$ shown in FIGS. 4A to 4D. Immediately after the time point $t_6$, the load L imposed on the gear shifting lever 2 is decreased rapidly as shown in FIG. 4A and a speed difference $\Delta V_2$ arises between the rotating speed N of the gear 52 and the rotating speed No of the output shaft 14 as shown in FIG. 4C.

Figure 4D:
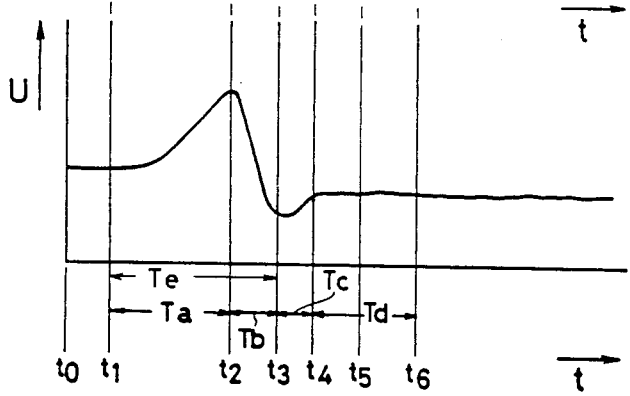

The time points $t_4$ and $t_6$ define a thrusting operation period Td shown in FIGS. 4A and 4D, and during such a thrusting operation period Td from the time point $t_4$ to the time point $t_6$, the internal spline teeth 47a provided on the synchronizing sleeve 47 complete to thrust the external spline teeth 53a, provided on the clutch gear 53. After the thrusting operation period Td has passed, the synchronizing sleeve 47 is further moved in accordance with the movement of the gear shifting lever 2 in the y direction so that the internal spline teeth 47a provided on the synchronizing sleeve 47 engage thoroughly with the external spline teeth 53a provided on the clutch gear 53 as shown in FIG. 3F, and the shifting operation of the gear shifting lever 2 for causing the gear 52 to be coupled with the output shaft 14 is completed.

The manual transmission 1 provided with the synchromesh device 50 and the gear shifting lever 2 as aforementioned is subjected to the method of evaluating a feeling of a gear shifting operation according to the present invention which is carried out with use of the testing apparatus 10.

In the testing apparatus 10, first, the type of the manual transmission 1 is detected and the input data Dx representing the detected type are supplied from the data input portion 41 to the controller 70 in the data processing unit 60 so as to make ready for evaluation about the manual transmission 1.

Next, the motor rotation sensor 21, input shaft rotation sensor 22, output shaft rotation sensor 23, load sensor 26, distance sensor 27 and torque sensor 28 are arranged to be positioned at respective sensing positions. The actuator 17 is arranged for operating the gear shifting lever 2. Further, the rotating axis of the motor 11 is coupled through the clutch device 13 with the input shaft 12 of the manual transmission 1 and the flywheel 15 is connected to the output shaft 14 of the manual transmission 1.

Then, the input data Dy representing a starting command are supplied from the data input portion 42 to the controller 90 in the drive control unit 80. The controller 90 generates the digital control signal Ca in response to the input data Dy and supplies the D/A converter 84 with the digital control signal Ca, so that the motor 11 is driven to rotate the input shaft 12 of the manual transmission 1. The controller 90 is operative to check the rotating speed of the motor 11 on the strength of the digital signal Sm', and supplies the D/A converter 85 with the digital control signal Cb so as to disengage the clutch device 13 and also supplies the lamp 83 with the lamp driving signal Cr to indicate the operating condition of the testing apparatus 10 when the rotating speed of the motor 11 becomes equal to or more than a predetermined speed.

After the clutch device 13 is put into disengagement, a speed difference arises between the rotating speed of the motor 11 and the rotating speed of the input shaft 12. When it is detected on the strength of the digital signals Sm'' and Si' that the speed difference between the rotating speed of the motor 11 and the rotating speed of the input shaft 12 reaches a predetermined value, the controller 90 produces the digital control signal Cc base on the digital signals Sw', Ss', So' and St' and supplies the D/A converter 86 with the digital control signal Cc to drive the actuator 17 so as to cause the gear shifting operation in the manual transmission 1.

The actuator 17, which is supplied with the driving signal Cc' produced by the drive control circuit 89 base on the digital control signal Cc, moves the gear shifting lever 2 to perform the shifting operation in a predetermined manner and select one of speeds in the manual transmission 1. After the shifting operation of the shifting operation of the gear shifting lever 2 is completed, the controller 90 supplies again the D/A converter 84 with the digital control signal Ca so as to drive the motor 11 at rotation speed equal to the rotation speed of the input shaft 12 of the manual transmission 1. When it is detected on the strength of the digital signals Sm' and Si' that the rotation speed of the motor 11 comes to be equal to the rotation speed of the input shaft 12 of the manual transmission 1, the controller 90 supplies the D/A converter 85 with the digital control signal Cb to engage the clutch device 13.

In the testing apparatus 10, the control operation as described above is performed for each of gear shifting operations carried out in the manual transmission 1 in accordance with a predetermined sequence and each gear shifting operation may be carried out in a different manner.

Such control operation in the testing apparatus 10 is mainly effected by the controller 90 contained in the drive control unit 80. The controller 90 is constituted with a microcomputer, for example, and an operating program of the microcomputer constituting the controller 90 is carried out in accordance with, for example, a flow chart shown in FIG. 5.

Figure 5:
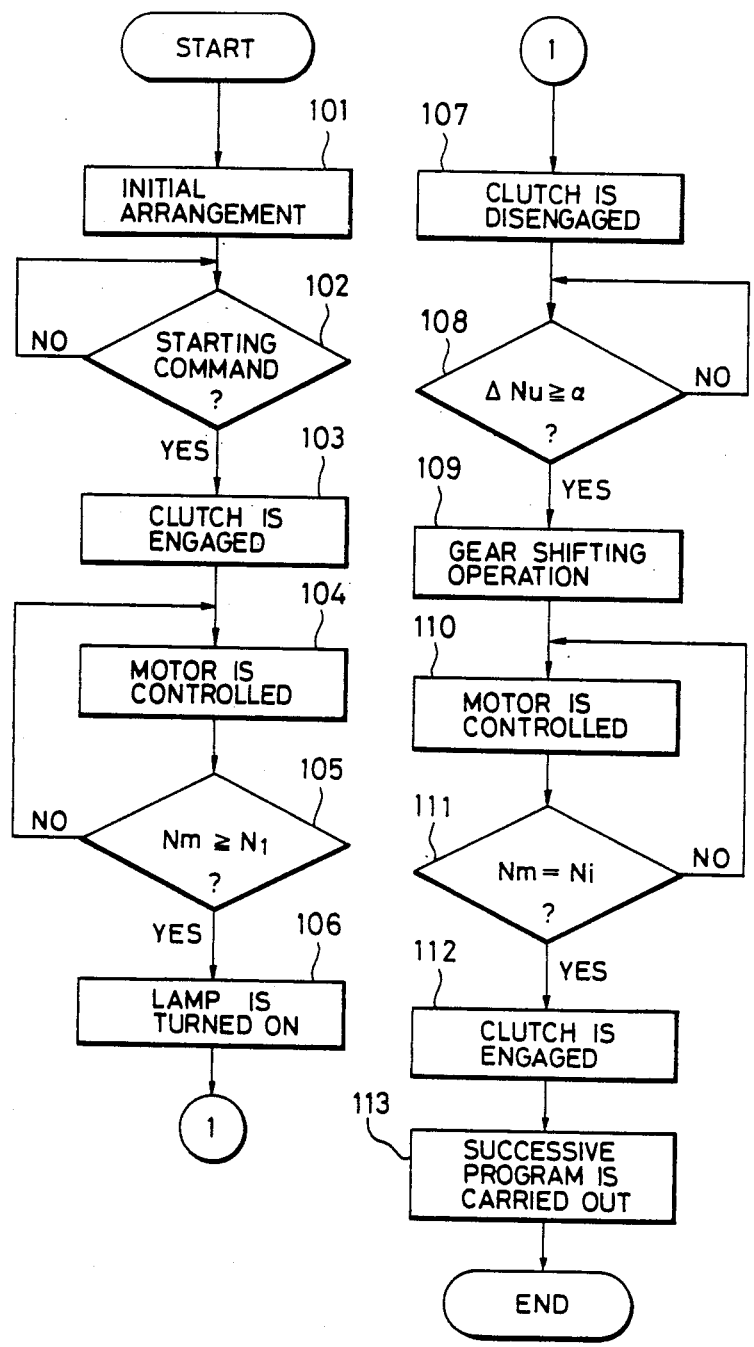
FIG. 5 is a flow chart of the control carried out by a control unit for causing a manual transmission to operate shown in FIG. 1.

The program of the flow chart shown in FIG. 5 commences with initial arrangements in process 101. In the initial arrangements in the process 101, the controller 90 is caused to make ready for storing the digital signals Sm', Si', Sw', Ss', So' and St' and the input data Dy and for processing the signals and data. Then, in decision 102, it is checked whether the input data Dy representing the starting command have been supplied from the data input portion 42 or not. If the input data Dy have not been supplied, the check in the decision 102 is repeated. When it is clarified in the decision 102 that the input data Dy have been supplied, the digital control signal Cb is sent out to the D/A converter 85 so that the clutch device 13 is engaged, in process 103, and then the digital control signal Ca is sent out to the D/A converter 84 so that the motor 11 is driven to increase its rotating speed, in process 104.

After that, in decision 105, it is checked on the strength of the digital signal Sm' whether a rotating speed Nm of the motor 11 is equal to or higher than a predetermined speed $N_1$ or not. If the rotation speed Nm of the motor 11 is lower than the predetermined speed $N_1$, the step returns to the process 104. To the contrary, if it is clarified in the decision 105 that the rotating speed Nm of the motor 11 is equal to or higher than the predetermined speed $N_1$, the lamp drive signal Cr is supplied to the lamp 83 to turn the same on, in process 106. Then, in process 107, the digital control signal Cb is sent out to the D/A converter 85 so as to put the clutch device 13 into disengagement.

Then, in decision 108, it is checked on the strength of the digital signals Sm'' and Si' whether a speed difference ΔNu between the rotating speed Nm of the motor 11 and the rotating speed Ni of the input shaft 12 is equal to or more than a predetermined value α or not. If the speed difference ΔNu is less than the predetermined value α, the check in the decision 108 is repeated. When it is clarified in the decision 108 that the speed difference ΔNu is equal to or more than predetermined value α, the digital control signal Cc is produced based on the digital signals Sw', Ss', So' and St' and sent out to the D/A converter 86 so that the actuator 17 is driven to move the gear shifting lever 2 to perform the shifting operation in a selected manner, in process 109.

After the shifting operation of the gear shifting lever 2 has completed, the digital control signal Ca is again sent out to the D/A converter 84 so that the motor 11 is driven to increase or decrease its rotating speed, in process 110. Then, in decision 111, it is checked on the strength of the digital signal Sm' and Si' whether the rotating speed Nm of the motor 11 is equal to the rotating speed Ni of the input shaft 12 of the manual transmission 1 or not. If the rotation speed Nm of the motor 11 is not equal to than the rotating speed Ni of the input shaft 12, the step returns to the process 110. To the contrary, if it is clarified in the decision 111 that the rotating speed Nm of the motor 11 is equal to the rotating speed Ni of the input shaft 12, the digital control signal Cb is sent out to the D/A converter 85 so that the clutch device 13 is engaged, in process 112. After that, a successive program for other gear shifting operations is carried out in process 113 and then the control is brought into the end.

Under a condition in which the control operation in the testing apparatus 10 is mainly effected by the controller 90 contained in the drive control unit 80 in such a manner as described above, an operation for evaluating at least one of heaviness and smoothness of the shifting operation of the gear shifting lever 2 is carried out in accordance with each of embodiments of the method according to the present invention as follows.

In a first embodiment, the input data Dx representing a starting command for a data making operation are supplied from the data input portion 41 to the controller 70 contained in the data processing unit 60. The controller 70 commences operating in response to the input data Dx with detecting the disengagement of the clutch device 13 based on the fact that the speed difference ΔNu between the rotating speed Nm of the motor 11 represented by the digital signal Sm' and the rotating speed Ni of the input shaft 12 represented by the digital signal Si' comes to equal to or more than the predetermined value.

Then, the controller 70 operates to detect the time point $t_1$ based on the distance $K_1$ in the moving distance K of the gear shifting lever 2 represented by the digital signal Ss', to calculate the rotating speed N of the gear 52 based on the rotating speed Ni of the input shaft 12 and a gear ratio in the manual transmission 1, and to detect based on the digital signal So' the time point $t_2$ at which the rotating speed N of the gear 52 becomes equal to the rotating speed No of the output shaft 14, so as to detect the synchronizing operation period Ta. Although the rotating speed N of the gear 52 decreases during the synchronizing operation period Ta, as shown in FIG. 4C, in the case of the shifting-up operation, the rotating speed N of the gear 52 increases during the synchronizing operation period Ta in case of the shifting-down operation.

During the synchronizing operation period Ta, the controller 70 measures the load L imposed on the gear shifting lever 2 based on the digital signal Sw' and calculates impulse acting upon the gear shifting lever 2 based on data obtained by the measurement of the load L so as to accumulate the calculated impulse. The impulse accumulated during the synchronizing operation period Ta is stored as a synchronizing impulse Fa in the RAM 72. Further, during the thrusting operation period Tb from the time point $t_2$ to the time point $t_3$, the controller 70 also measures the load L imposed on the gear shifting lever 2 based on the digital signal Sw' and calculates impulse acting upon the gear shifting lever 2 based on data obtained by the measurement of the load L so as to accumulate the calculated impulse. The impulse accumulated during the thrusting operation period Tb is stored as a thrusting impulse Fb in the RAM 72.

Then, the controller 70 adds to the thrusting impulse Fb to the synchronizing impulse Fa to obtain a synchronizing and thrusting impulse Fe in a synchronizing and thrusting operation period Te which includes both the synchronizing operation period Ta and the thrusting operation period Tb, as shown in FIGS. 4A to 4D. The synchronizing and thrusting impulse Fe thus calculated is stored in the RAM 72.

After that, whenever the shifting operation of the gear shifting lever 2 is carried out, synchronizing impulse Fa, thrusting impulse Fb, and synchronizing and thrusting impulse Fe are calculated to be stored in the RAM 72. When the synchronizing impulse Fa, thrusting impulse Fb and synchronizing and thrusting impulse Fe have been completed to be stored in the RAM 72, the input data Dx commanding to make a data output is supplied from the data input portion 41 to the controller 70. The controller 70 operates in response to the input data Dx to deliver the output data signal Oa representing the synchronizing impulse Fa, thrusting impulse Fb, and synchronizing and thrusting impulse Fe stored in the RAM 72 to the output data memory 74, printer 75 and display device 76, so that data representing the synchronizing impulse Fa, thrusting impulse Fb, and synchronizing and thrusting impulse Fe are stored in the output data memory 74, printed out by the printer 75 and displayed on the display device 76.

With the data representing the synchronizing impulse Fa, thrusting impulse Fb, and synchronizing and thrusting impulse Fe obtained as mentioned above, heaviness of the shifting operation of the gear shifting lever 2 is evaluated as described below.

In the shifting operation of the gear shifting lever 2 in the manual transmission 1, the synchronizing impulse Fa is almost constant through the synchronizing operation period Ta, and the thrusting impulse Fb increases linearly during the thrusting operation period Tb because the load L necessitated to act upon the gear shifting lever 2 in the thrusting operation period Tb is almost constant.

Figure 6A:
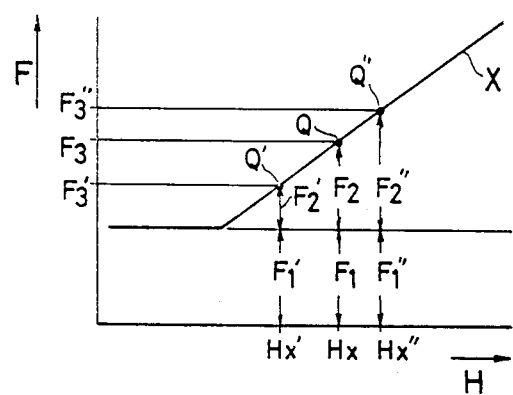
FIGS. 6A to 6C and 7 are characteristic diagrams used for explaining an evaluation about heaviness of a shifting operation of a gear shifting lever made through one embodiment of method according to the present invention.

Accordingly, when three shifting operations of the gear shifting lever 2 are curried out in the manual transmission 1 selected as a reference one which has a heaviness of the shifting operation of the gear shifting lever 2 evaluated to be at the maximum permissible limit, and concrete values $F_3'$, $F_3$, and $F_3''$ of synchronizing and thrusting impulse Fe are respectively obtained through synchronizing and thrusting operation periods in the respective shifting operations spending times $Hx'$, $Hx$ and $Hx''$, respectively, the concrete value $F_3'$ corresponds to the sum of a concrete value $F_1'$ of synchronizing impulse Fa and o a concrete value $F_2'$ of thrusting impulse Fb, the concrete value $f_3$ corresponds to the sum of a concrete value $F_1$ of synchronizing impulse Fa and a concrete value $F_2$ of thrusting impulse Fb, and the concrete value $F_3''$ corresponds to the sum of a concrete value $F_1''$ of synchronizing impulse Fa and a concrete value $F_2''$ of thrusting impulse Fb, as shown on a characteristic chart having an ordinate representing impulse F and an abscissa representing time H in FIG. 6A. Further, as shown in FIG. 6A, a point $Q'$ representing the concrete value $F_3'$ at the time $Hx'$, a point Q representing the concrete value $F_3$ at the time Hx, and a point $Q''$ representing the concrete value $F_3''$ at the time $Hx''$ are aligned on a line X.

Then, the evaluation about the heaviness of the shifting operation of the gear shifting lever 2 in the manual transmission 1 other than the reference one on the strength of the synchronizing and thrusting impulse Fe is done with use of the line X in FIG. 6A as a reference line.

Figure 6B:
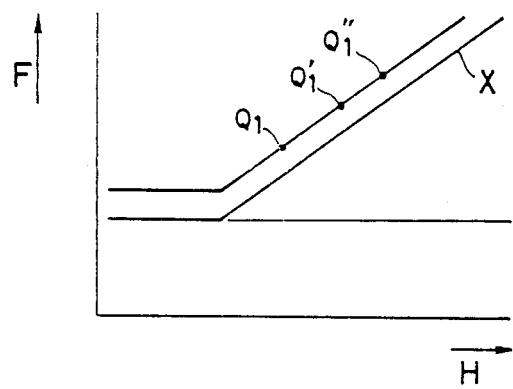
Figure 6C:
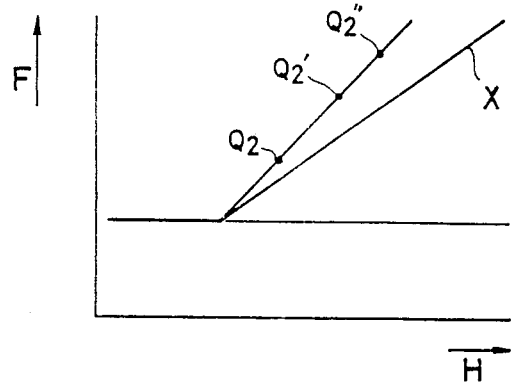

In such evaluation, the synchronizing and thrusting impulse Fe which is represented by the data obtained from the controller 70 is plotted on the characteristic chart shown in FIG. 6A, and it is checked whether the heaviness of the sifting operation of the gear shifting lever 2 is permissible or not on the basis of one of areas divided by the line X on the characteristic chart in which the synchronizing and thrusting impulse Fe is plotted. In the case of the manual transmission 1 in which the heaviness of the shift operation of the gear shifting lever 2 is not permissible in the synchronizing operation period Ta, concrete values of the synchronizing impulse Fa are too large and points $Q_1'$, $Q_1$ and $Q_1''$ which correspond to the points $Q'$, Q and $Q''$, respectively, are aligned as shown in FIG. 6B. Further, in the case of the manual transmission 1 in which the heaviness of the shift operation of the gear shifting lever 2 is not permissible in the thrusting operation period Tb, concrete values of the thrusting impulse Fb are too large and points $Q_2'$, $Q_2$ and $Q_2''$ which correspond to the points $Q'$, Q and $Q''$, respectively, are aligned as shown in FIG. 6C.

Accordingly, the heaviness of the shifting operation of the gear shifting lever 2 in the manual transmission 1 is evaluated quantitatively on the strength of the concrete values of the synchronizing and thrusting impulse Fe.

Figure 7:
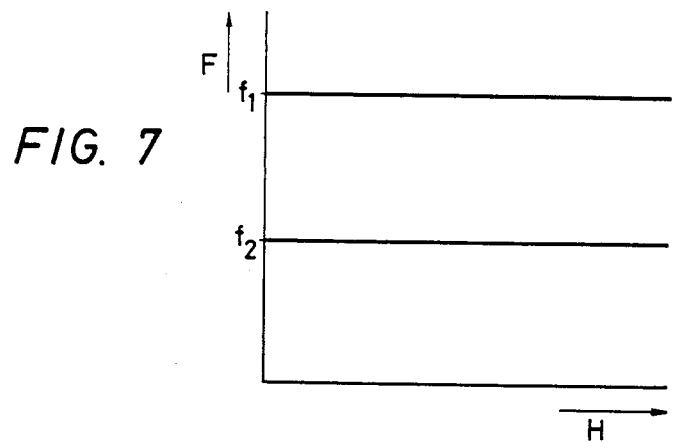

Further, the evaluation about the heaviness of the shifting operation of the gear shifting lever 2 in the manual transmission 1 on the strength of the synchronizing impulse Fa is done with use of a characteristic chart shown in FIG. 7 with an ordinate representing impulse F and an abscissa representing time H. In this evaluation, the synchronizing impulse Fa which is represented by the data obtained from the controller 70 is plotted on the characteristic chart shown in FIG. 7, and it is checked whether the heaviness of the sifting operation of the gear shifting lever 2 is permissible or not on the basis of one of areas divided by lines representing respectively predetermined values $f_1$ and $f_2$ of the impulse F on the characteristic chart in which the synchronizing impulse Fa is plotted. Such evaluation performed on the strength of the synchronizing impulse Fa may be combined with the evaluation performed on the strength of the synchronizing and thrusting impulse Fe for making an integrated evaluation about the shifting operation of the gear shifting lever 2 in the manual transmission 1.

In addition to the evaluations as described above, an evaluation on the basis of both the synchronizing impulse Fa and the thrusting impulse Fb calculated independently or an evaluation on the basis of the whole of the synchronizing and thrusting impulse Fe, the synchronizing impulse Fa and the thrusting impulse Fb ma be curried out.

In the first embodiment described above, although the time point $t_2$ is detected as a time point at which the rotating speed N of the gear 52 comes to be equal to the rotating speed No of the output shaft 14 of the manual transmission 1, it is also possible to detect the time point $t_2$ as a time point at which the output torque U represented by the digital signal $St'$ takes the maximum value in the synchronizing and thrusting operation period Td.

In a second embodiment, the input data Dx representing a starting command for a data making operation are supplied from the data input portion 41 to the controller 70 contained in the data processing unit 60. The controller 70 commences operating in response to the input data Dx with detecting the disengagement of the clutch device 13 based on the fact that the speed difference ΔNu between the rotating speed Nm of the motor 11 represented by the digital signal $Sm'$ and the rotating speed Ni of the input shaft 12 represented by the digital signal $Si'$ comes to equal to or more than the predetermined value α.

Then, the controller 70 operates to detect the time point $t_1$ as a time point at which an increasing rate of the load L imposed on the gear shifting lever 2, which is calculated based on signal $Sw'$, comes to equal to or more than a predetermined value and further to detect the time point $t_3$ as a time point at which a decreasing rate of the load L imposed on the gear shifting lever 2, which is also calculated based on digital signal $Sw'$, comes to equal to or more than a predetermined value so as to detect a synchronizing and thrusting operation period Te which extends from the time point $t_1$ to the time point $t_3$ and therefore includes both the synchronizing operation period Ta and the thrusting operation period Tb, as shown in FIGS. 4A to 4D.

During the synchronizing and thrusting operation period Te, the controller 70 measures the load L imposed on the gear shifting lever 2 and the moving distance K of the gear shifting lever 2 based on the digital signal $Sw'$ and the digital signal $Ss'$, respectively, and calculates work load acting upon the gear shifting lever 2 based on data obtained by the measurement of the load L and the moving distance K so as to accumulate the calculated work load. The work load accumulated during the synchronizing and thrusting operation period Te is stored as a synchronizing and thrusting work load We in the RAM 72.

After that, whenever the shifting operation of the gear shifting lever 2 is carried out, synchronizing and thrusting work load We is calculated to be stored in the RAM 72. When the store of the synchronizing and thrusting work load we in the RAM 72 is completed, the input data Dx commanding to make a data output is supplied from the data input portion 41 to the controller 70. The controller 70 operates in response to the input data Dx to deliver the output data signal Oa representing the synchronizing and thrusting work load We stored in the RAM 72 to the output data memory 74, printer 75 and display device 76, so that data representing the synchronizing and thrusting work load We are stored in the output data memory 74, printed out by the printer 75 and displayed on the display device 76.

With the data representing the synchronizing and thrusting work load We obtained as mentioned above, heaviness of the shifting operation of the gear shifting lever 2 is evaluated as described below.

In the shifting operation of the gear shifting lever 2 in the manual transmission 1, the load L imposed on the gear shifting lever 2 decreases in inverse proportion to lapse of time during the synchronizing operation period Ta and therefore work load Wa acting upon the gear shifting lever 2 in the synchronizing operation period Ta also decreases in inverse proportion to lapse of time, and work load Wb acting upon the gear shifting lever 2 in the thrusting operation period Tb is almost constant because the load L necessitated to act upon the gear shifting lever 2 in the thrusting operation period Tb is almost constant. Accordingly, when three shifting operations of the gear shifting lever 2 are curried out in the manual transmission 1 selected as a reference one which has a heaviness of the shifting operation of the gear shifting lever 2 evaluated to be at the maximum permissible limit, and concrete values $W_3'$, $W_3$, and $W_3''$ of synchronizing and thrusting work load We are respectively obtained through synchronizing and thrusting operation periods in the respective shifting operations spending times $Hz'$, $Hz$ and $Hz''$, respectively, the concrete value $W_3''$ corresponds to the sum of a concrete value $W_1''$ of work load Wa in the synchronizing operation period Ta and a concrete value $W_2'$ of work load Wb in the thrusting operation period Tb, the concrete value $W_3$ corresponds to the sum of a concrete value $W_1$ of work load Wa in the synchronizing operation period Ta and a concrete value $W_2$ of work load Wb in the thrusting operation period Tb, and the concrete value $W_3''$ corresponds to the sum of a concrete value $W_1''$ of work load Wa in the synchronizing operation period Ta and a concrete value $W_2''$ of work load Wb in the thrusting operation period Tb, as shown on a characteristic chart having an ordinate representing work load W and an abscissa representing time H in FIG. 8A. Further, as shown in FIG. 8A, a point R' representing the concrete value $W_3'$ at the time $Hz'$, a point R representing the concrete value $W_3$ at the time Hz, and a point R" representing the concrete value $W_3''$ at the time $Hz''$ are aligned on a curve Z.

Figure 8A:
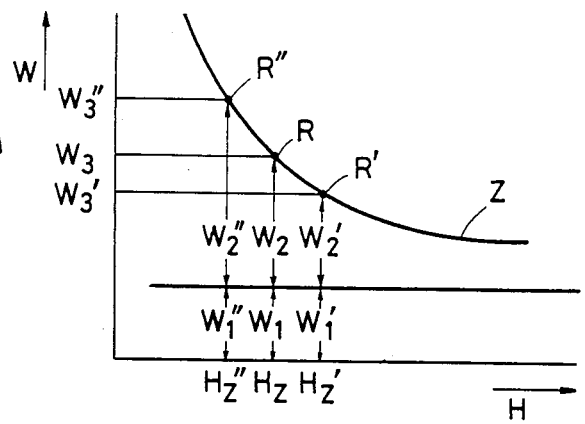
FIGS. 8A to 8C are characteristic diagrams used for explaining an evaluation about heaviness of a shifting operation of a gear shifting lever made through another embodiment of method according to the present invention.

Then, the evaluation about the heaviness of the shifting operation of the gear shifting lever 2 in the manual transmission 1 other than the reference one on the strength of the synchronizing and thrusting work load We is done with use of the curve Z in FIG. 8A as a reference curve.

Figure 8B:
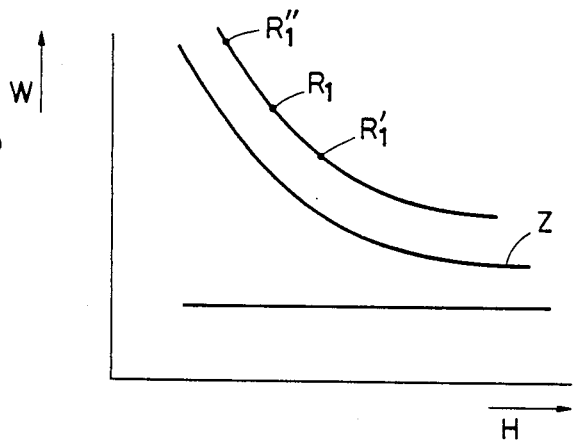
Figure 8C:
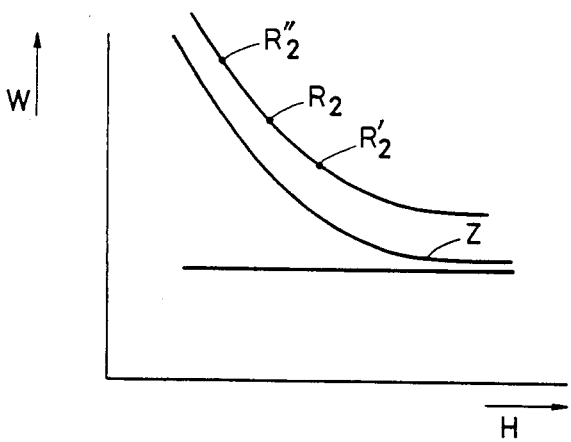

In such evaluation, the synchronizing and thrusting work load We which is represented by the data obtained from the controller 70 is plotted on the characteristic chart shown in FIG. 8A, and it is checked whether the heaviness of the sifting operation of the gear shifting lever 2 is permissible or not on the basis of one of areas divided by the curve Z on the characteristic chart in which the synchronizing and thrusting work load We is plotted. In the case of the manual transmission 1 in which the heaviness of the shift operation of the gear shifting lever 2 is not permissible in the synchronizing operation period Ta, concrete values of the work load Wa in synchronizing operation period Ta are too large and points $R_1'$, $R_1$ and $R_1''$ which correspond to the points R', R and R", respectively, are aligned as shown in FIG. 8B. Further, in the case of the manual transmission 1 in which the heaviness of the shift operation of the gear shifting lever 2 is not permissible in the thrusting operation period Tb, concrete values of the work load Wb in the thrusting operation period Tb are too large and points $R_2'$, $R_2$ and $R_2''$ which correspond to the points R', R and R", respectively, are aligned as shown in FIG. 8C.

Accordingly, the heaviness of the shifting operation of the gear shifting lever 2 in the manual transmission 1 is evaluated quantitatively on the strength of the concrete values of the synchronizing and thrusting work load We.

In a third embodiment, after the input data Dx representing a starting command for a data making operation have been supplied from the data input portion 41 to the controller 70 and the disengagement of the clutch device 13 has been detected by the controller 70, the controller 70 operates to detect the time point $t_4$ as a time point at which the load L imposed on the gear shifting lever 2 and represented by the signal Sw' takes the minimum value first after the thrusting operation period Tb and further to detect the time point $t_6$ as a time point at which the load L imposed on the gear shifting lever 2 takes the minimum value second after the thrusting operation period Tb so as to detect the thrusting operation period Td which extends from the time point $t_4$ to the time point $t_6$.

During the thrusting operation period Td, the controller 70 measures the load L imposed on the gear shifting lever 2 based on the digital signal Sw', and calculates impulse acting upon the gear shifting lever 2 based on data obtained by the measurement of the load L s as to accumulate the calculated impulse. The impulse accumulated during the thrusting operation period Td is stored as a thrusting impulse Fd in the RAM 72. After that, whenever the shifting operation of the gear shifting lever 2 is carried out, thrusting impulse Fd is calculated to be stored in the RAM 72. When the store of the thrusting impulse Fd in the RAM 72 is completed, the input data Dx commanding to make a data output is supplied from the data input portion 41 to the controller 70. The controller 70 operates in response to the input data Dx to deliver the output data signal Oa representing the thrusting impulse Fd stored in the RAM 72 to the output data memory 74, printer 75 and display device 76, so that data representing the thrusting impulse Fd are stored in the output data memory 74, printed out by the printer 75 and displayed on the display device 76.

With the data representing the thrusting impulse Fd obtained as mentioned above, evaluation about smoothness of the shifting operation of the gear shifting lever 2 is made in accordance with such thinking that the smaller the thrusting impulse Fd, the smoother the shifting operation of the gear shifting lever 2 is carried out or that the smoothness of the shifting operation of the gear shifting lever 2 is permissible when the thrusting impulse Fd is smaller than a predetermined reference value. As a result, the smoothness of the shifting operation of the gear shifting lever 2 is evaluated quantitatively on the strength of concrete values of the thrusting impulse Fd.

In a fourth embodiment, after the input data Dx representing a starting command for a data making operation have been supplied from the data input portion 41 to the controller 70 and the disengagement of the clutch device 13 has been detected by the controller 70, the controller 70 operates to detect the time point $t_4$ as a time point at which the load L imposed on the gear shifting lever 2 and represented by the signal Sw' takes the minimum value first after the thrusting operation period Tb and further to detect the time point $t_6$ as a time point at which the load L imposed on the gear shifting lever 2 takes the minimum value second after the thrusting operation period Tb so as to detect the thrusting operation period Td which extends from the time point $t_4$ to the time point $t_6$.

During the thrusting operation period Td, the controller 70 measures the load L imposed on the gear shifting lever 2 and the moving distance K of the gear shifting lever 2 based on the digital signal Sw" and the digital signal Ss', respectively, and calculates work load acting upon the gear shifting lever 2 based on data obtained by the measurement of the load L and the moving distance K so as to accumulate the calculated work load. The work load accumulated during the thrusting operation period Td is stored as a thrusting work load Wd in the RAM 72.

After that, whenever the shifting operation of the gear shifting lever 2 is carried out, thrusting work load Wd is calculated to be stored in the RAM 72. When the store of the thrusting work load Wd in the RAM 72 is completed, the input data Dx commanding to make a data output is supplied from the data input portion 41 to the controller 70. The controller 70 operates in response to the input data Dx to deliver the output data signal Oa representing the thrusting work load Wd stored in the RAM 72 to the output data memory 74, printer 75 and display device 76, so that data representing the thrusting work load Wd are stored in the output data memory 74, printed out by the printer 75 and displayed on the display device 76.

With the data representing the thrusting work load Wd obtained as mentioned above, evaluation about smoothness of the shifting operation of the gear shifting lever 2 is made in accordance with such thinking that the smaller the thrusting work load Wd, the smoother the shifting operation of the gear shifting lever 2 is carried out or that the smoothness of the shifting operation of the gear shifting lever 2 is permissible when the thrusting work load Wd is smaller than a predetermined reference value. As a result, the smoothness of the shifting operation of the gear shifting lever 2 is evaluated quantitatively on the strength of concrete values of the thrusting work load Wd.

In a fifth embodiment, after the input data Dx representing a starting command for a data making operation have been supplied from the data input portion 41 to the controller 70 and the disengagement of the clutch device 13 has been detected by the controller 70, the controller 70 operates to detect the time point $t_4$ as a time point at which an the load L imposed on the gear shifting lever 2 and represented by the signal Sw' takes the minimum value first after the thrusting operation period Tb and further to detect the time point $t_6$ as a time point at which the load L imposed on the gear shifting lever 2 takes the minimum value second after the thrusting operation period Tb so as to detect the thrusting operation period Td which extends from the time point $t_4$ to the time point $t_6$.

During the thrusting operation period Td, the controller 70 measures the load L imposed on the gear shifting lever 2 based on the digital signal Sw' and calculates a rate of change $\Delta L$ of the load L by differentiating measured values of the load L at an interval of a predetermined short period. The rates of change $\Delta L$ of the load L thus calculated is subjected to selection of the maximum value thereof, and the maximum value of the rate of change $\Delta L$ of the load L imposed on the gear shifting lever 2 is stored as a maximum rate of change $\Delta L_{max}$ of thrusting load Ld in the RAM 72.

After that, whenever the shifting operation of the gear shifting lever 2 is carried out, the maximum rate of change $\Delta L_{max}$ of thrusting load Ld is obtained to be stored in the RAM 72. When the store of the maximum rate of change $\Delta L_{max}$ of thrusting load Ld in the RAM 72 is completed, the input data Dx commanding to make a data output is supplied from the data input portion 41 to the controller 70. The controller 70 operates in response to the input data Dx to deliver the output data signal Oa representing the maximum rate of change $\Delta L_{max}$ of thrusting load Ld stored in the RAM 72 to the output data memory 74, printer 75 and display device 76, so that data representing the maximum rate of change $\Delta L_{max}$ of thrusting load Ld are stored in the output data memory 74, printed out by the printer 75 and displayed on the display device 76.

Figure 9:
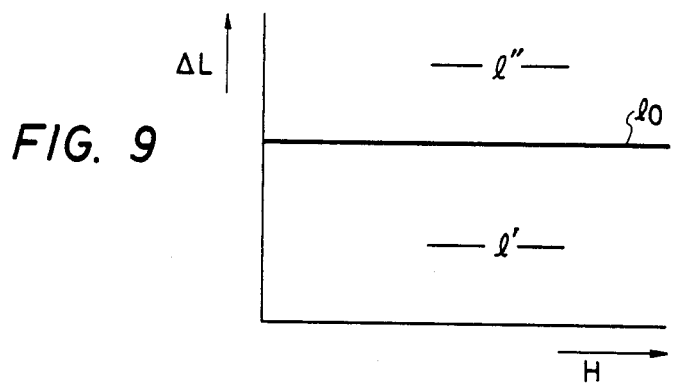
FIGS. 9 and 10 are characteristic diagrams used for explaining evaluations about smoothness of a shifting operation of a gear shifting lever made respectively through other embodiments of method according to the present invention.

With the data representing the maximum rate of change $\Delta L_{max}$ of thrusting load Ld obtained as mentioned above, smoothness of the shifting operation of the gear shifting lever 2 is evaluated with use of a characteristic chart which is shown in FIG. 9 with an ordinate representing rate of change $\Delta L$ and an abscissa representing time H. In this evaluation, the maximum rate of change $\Delta L_{max}$ of thrusting load Ld which is represented by the data obtained from the controller 70 is plotted on the characteristic chart shown in FIG. 9, and it is checked whether the smoothness of the shifting operation of the gear shifting lever 2 is permissible or not on the basis of one of areas l' and l" divided by a line lo representing a predetermined value of the rate of change $\Delta L$ of the load L on the characteristic chart in which the maximum rate of change $\Delta L_{max}$ of thrusting load Ld is plotted, in accordance with such thinking that the smoothness of the shift operation of the gear shifting lever 2 is permissible when the maximum rate of change $\Delta L_{max}$ of thrusting load Ld is plotted in the area l" under the line lo. As a result, the smoothness of the shifting operation of the gear shifting lever 2 is evaluated quantitatively on the strength of concrete values of the maximum rate of change $\Delta L_{max}$ of thrusting load Ld.

Although the smoothness of the shifting operation of the gear shifting lever 2 is evaluated on the basis of the maximum rate of change $\Delta L_{max}$ of thrusting load Ld in this embodiment, it is also possible to adopt a positive rate of change $\Delta L$ of the load L imposed on the gear shifting lever 2 during the thrusting operation period Td, in place of the maximum rate of change $\Delta L_{max}$ of thrusting load Ld, for evaluating quantitatively the smoothness of the shifting operation of the gear shifting lever 2 in accordance with the present invention.

In a sixth embodiment, after the input data Dx representing a starting command for a data making operation have been supplied from the data input portion 41 to the controller 70 and the disengagement of the clutch device 13 has been detected by the controller 70, the controller 70 operates to detect based on the digital signal Sw' a maximum value $L_1$ of the load L imposed on the gear shifting lever 2 during a synchronizing and thrusting operation period Te including both the synchronizing operation period Ta and the thrusting operation period Tb, a minimum value $L_2$ of the load L imposed on the gear shifting lever 2 during the meshing operation period Tc, and a maximum value $L_3$ of the load L imposed on the gear shifting lever 2 during the thrusting operation period Td, as shown in FIG. 4A, and to calculate a coefficient of smoothness SMT in accordance with such a predetermined numerical expression as described below base on the maximum value $L_1$, minimum value $L_2$ and maximum value $L_3$.

$$SMT = (L_3 - L_2) L_3/L_1$$

In this numerical expression, $(L_3-L_2)$ represents the amplitude of the peak level of the load L which appears at the time point $t_5$ in the thrusting operation period Td, which exerts an influence directly on smoothness of the shifting operation of the gear shifting lever 2. Further, $L_3/L_1$ compensates $(L_3-L_2)$ with a ratio of the maximum value $L_3$ in the thrusting operation period Td to the maximum value $L_1$ in the synchronizing and thrusting operation operation period Te.

The coefficient of smoothness SMT calculated in accordance with the numerical expression mentioned above is stored in the RAM 72.

Then, whenever the shifting operation of the gear shifting lever 2 is carried out, a coefficient of smoothness SMT is obtained to be stored in the RAM 72. When the store of the coefficient of smoothness SMT in the RAM 72 is completed, the input data Dx commanding to make a data output is supplied from the data input portion 41 to the controller 70. The controller 70 operates in response to the input data Dx to deliver the output data signal Oa representing the coefficient of smoothness SMT stored in the RAM 72 to the output data memory 74, printer 75 and display device 76, so that data representing the coefficient of smoothness SMT are stored in the output data memory 74, printed out by the printer 75 and played on the display device 76.

With the data representing the coefficient of smoothness SMT obtained as mentioned above, evaluation about smoothness of the shifting operation of the gear shifting lever 2 is made in accordance with such thinking that the smaller the coefficient of smoothness SMT is, the smoother the shifting operation of the gear shifting lever 2 is carried out or that the smoothness of the shifting operation of the gear shifting lever 2 is permissible when the coefficient of smoothness SMT is smaller that a predetermined reference value. As a result, the smoothness of the shifting operation of the gear shifting lever 2 is evaluated quantitatively on the strength of concrete values of the coefficient of smoothness SMT.

In a seventh embodiment, after the input data Dx representing a starting command for a data making operation have been supplied from the data input portion 41 to the controller 70 and the disengagement of the clutch device 13 has been detected by the controller 70, the controller 70 operates to detect the point $t_1$ and $t_2$ in the same manner as the first embodiment so as to detect the synchronizing operation period Ta. During the synchronizing operation period Ta, the controlled 70 measures the load L imposed on the gear shifting lever 2 based on the digital signal Sw' and calculates a dynamic friction coefficient $\mu$ between the synchronizer ring 55 and the conical portion 54 incorporated with the gear 52, based on data obtained by the measurement of the load L, in accordance with a predetermined numerical expression described below.

$$\mu = (2 \cdot U \cdot \sin\beta)/(\c \cdot D \cdot L)$$

where U: output torque represented by the digital signal St', $\beta$: a half of a cone angle of the conical portion 54, ç: a power transmitting constant between the gear shifting lever 2 and the synchronizing sleeve 47, D: an effective radius of the conical portion 54.

The dynamic friction coefficient $\mu$ calculated in accordance with the numerical expression mentioned above is stored as a synchronizing impulse Fa in the RAM 72. Then, whenever the shifting operation of the gear shifting lever 2 is carried out, the dynamic friction coefficient $\mu$ is calculated to be stored in the RAM 72. When the store of the dynamic friction coefficient $\mu$ into the RAM 72 is completed, the input data Dx commanding to make a data output is supplied from the data input portion 41 to the controller 70. The controller 70 operates in response to the input data Dx to deliver the output data signal Oa representing the dynamic friction coefficient $\mu$ stored in the RAM 72 to the output data memory 74, printer 75 and display device 76, so that data representing the dynamic friction coefficient $\mu$ are stored in the output data memory 74, printed out by the printer 75 and displayed on the display device 76.

Figure 10:
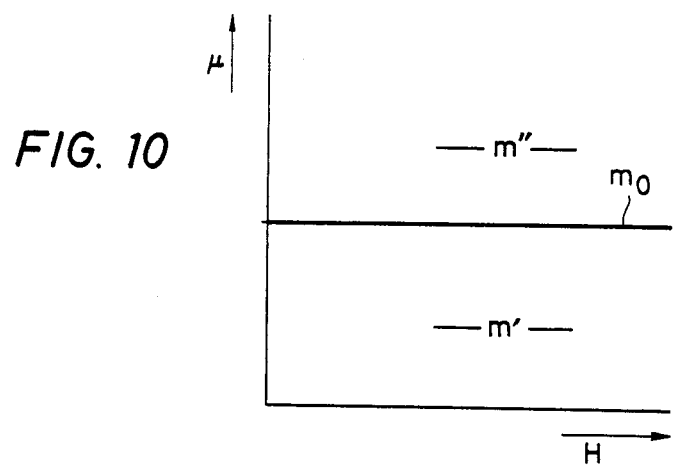

With the data representing the dynamic friction coefficient $\mu$, synchronizing performance of the synchromesh device 50 is evaluated with use of a characteristic chart which is shown in FIG. 10 with an ordinate representing dynamic friction coefficient $\mu$ and an abscissa representing time H. In the evaluation, the dynamic friction coefficient $\mu$ which is represented by the data from the controller 70 is plotted on the characteristic chart shown in FIG. 10, and it is checked whether the synchronizing performance of the synchromesh device 50 is allowable or not on the basis of one of areas m' and m'' divided by a line $m_o$ representing a predetermined value of the dynamic friction coefficient $\mu$ on the characteristic chart in which the dynamic friction coefficient $\mu$ represented by the data from the controller 70 is plotted, in accordance with such thinking that the synchronizing performance of the synchromesh device 50 is allowable when the dynamic friction coefficient $\mu$ represented by the data from the controller 70 resides in the area m'' over the line $m_o$ before the end of the synchronizing operation period Ta. As a result, the synchronizing performance of the synchromesh device 50 is evaluated quantitatively on the strength of concrete values of the dynamic friction coefficient $\mu$ represented by the data from the controller 70.

Such evaluation about the synchronizing performance of the synchromesh device 50 on the basis of the dynamic friction coefficient $\mu$ between the synchronizer ring 55 and the conical portion 54 incorporated with the gear 52 makes effective contributions to evaluation about heaviness or smoothness of the shifting operation of the gear shifting lever 2 which is made quantitatively in the manual transmission 1.

Further, in an eighth embodiment, after the input data Dx representing a starting command for a data making operation have been supplied from the data input portion 41 to the controller 70 and the disengagement of the clutch device 13 has been detected by the controller 70, the controller 70 operates to calculate the rotating speed N of the gear 52 based on the rotating speed Ni of the input shaft 12 which is represented by the digital signal Si' and a gear ratio in the manual transmission 1, and to detect the speed difference $\Delta V_1$ between the rotating speed N of the gear 52 and the rotating speed No of the output shaft 14 represented by the digital signal So' in the thrusting operation period Tb, a speed difference between the rotating speed N of the gear 52 and the rotating speed No of the output shaft 14 in the meshing operation period Tc, and the speed difference $\Delta V_2$ between the rotating speed N of the gear 52 and the rotating speed No of the output shaft 14 in the thrusting operation period Td. These speed differences between the rotating speed N of the gear 52 and the rotating speed No of the output shaft 14 in the thrusting operation period Tb, the meshing operation period Tc and the thrusting operation period Td are stored in the RAM 72.

Then, whenever the shifting operation of the gear shifting lever 2 is carried out, such speed differences as described above are detected to be stored in the RAM 72. When the store of the speed differences into the RAM 72 is completed, the input data Dx commanding to make a data output is supplied from the data input portion 41 to the controller 70. The controller 70 operates in response to the input data Dx to deliver the output data signal Oa representing the speed differences stored in the RAM 72 to the output data memory 74, printer 75 and display device 76, so that data representing the speed differences are stored in the output data memory 74, printed out by the printer 75 and displayed on the display device 76.

With the data representing the speed differences obtained as mentioned above, synchronizing performance of the synchromesh device 50 is evaluated as follows, for example. That is, it is checked on the strength of the speed difference $\Delta V_1$ whether the thrusting operation of the internal spline teeth 47a provided on the synchronizing sleeve 47 to the external spline teeth 55a provided on the synchronizer ring 55 commences properly at the time point t2 or not, and it is also checked, on the strength of the speed difference between the rotating speed N of the gear 52 and the rotating speed No of the output shaft 14 in the meshing operation period Tc, whether the synchronizer ring 5 engages firmly with the conical portion 54 incorporated with the gear 52 when the internal spline teeth 47a provided on the synchronizing sleeve 47 thrust through the external spline teeth 55a provided on the synchronizer ring 55 or not. Further, the speed difference $\Delta V_2$ is used for making a confirmation of the engagement of the synchronizing sleeve 47 with the clutch gear 53 incorporated with the gear 52. Based on the results of these checks, the synchronizing performance of the synchromesh device 50 is evaluated quantitatively. Such evaluation about the synchronizing performance of the synchromesh device 50 made on the basis of the speed differences between the rotating speed N of the gear 52 and the rotating speed No of the output shaft 14 in respective operation periods makes also effective contributions to evaluation about heaviness or smoothness of the shifting operation of the gear shifting lever 2 which is made quantitatively in the manual transmission 1.

What is claimed is:

1. A method of evaluating a feeling of a gear shifting operation in a manual transmission which is provided with a gear shifting lever and a synchromesh device including a synchronizing sleeve, a synchronizer ring and a clutch gear incorporated with a gear to synchronize and operating in response to a shifting operation of the gear shifting lever, comprising the steps of:

causing the gear shifting lever to perform the shifting operation so as to put one of gear trains in the manual transmission into a power transmitting state through the synchromesh device, measuring at least load imposed on the gear shifting lever during a predetermined period within the shifting operation of the gear shifting lever, obtaining at least one calculated value based on data obtained by at least measurement of the load imposed on the gear shifting lever, and evaluating at least one of heaviness and smoothness of the shifting operation of the gear shifting lever on the strength of the calculated value.

2. A method according to claim 1, wherein at least one of impulse and work load acting upon the gear shifting lever in a period from a first time point at which spline teeth provided on the synchronizing sleeve commence to engage with spline teeth provided on the synchronizer ring to a second time point at which the spline teeth provided on the synchronizing sleeve complete to thrust through the spline teeth provided with the synchronizer ring, is calculated as said calculated value, and the heaviness of the shifting operation of the gear shifting lever is evaluated on the strength of at least one of the impulse and work load calculated.

3. A method according to claim 2, wherein the impulse acting upon the gear shifting lever in the period from said first time point to said second time point is calculated as said calculated value, and the heaviness of the shifting operation of the gear shifting lever is evaluated on the strength of the impulse calculated.

4. A method according to claim 3, wherein a first part of said impulse which acts upon the gear shifting lever during a first period from said first time point to a third time point at which the clutch gear is thoroughly synchronized in rotation through the synchronizer ring with the synchronizing sleeve and a second part of said impulse which acts upon the gear shifting lever during a second period from said third time point to said second time point are calculated independently, and the heaviness of the shifting operation of the gear shifting lever is evaluated on the strength of at least on of the first and second part of said impulse.

5. A method according to claim 4, wherein a rotating speed of the synchronizing sleeve and a rotating speed of the gear to synchronize are detected respectively and said third time point is detected as a time point at which the rotating speed of the gear to synchronize comes to substantially equal to the rotating speed of the synchronizing sleeve in the step of obtaining at least one calculating value.

6. A method according to claim 4, wherein output torque obtained on an output shaft of the manual transmission on which the synchronizing sleeve is mounted to rotate together is detected and said third time point is detected as a time point at which the output torque takes a maximum value in the period from said first time point to said second time point in the step of obtaining at least one calculating value.

7. A method according to claim 2, wherein a rotating speed of the synchronizing sleeve and a rotating speed of the gear to synchronize are detected respectively so that a speed difference between the rotating speed of the synchronizing sleeve and the rotating speed of the gear to synchronize in the period from said first time point to said second time point is calculated and synchronizing performance of the synchromesh device is evaluated on the basis of the calculated speed difference in advance of evaluation about the heaviness of the shifting operation of the gear shifting lever in the step of evaluating.

8. A method according to claim 2, wherein friction coefficient between the synchronizer ring and a conical portion incorporated with the gear to synchronize for engaging frictionally with the synchronizer ring is calculated as said calculated value based on the date obtained by at least measurement of the load imposed on the gear shifting lever in the period from said first time point to said second time point, and synchronizing performance of the synchromesh device is evaluated on the basis of the calculated friction coefficient in advance of evaluation of at least one of heaviness and smoothness of the shifting operation of the gear shifting lever in the step of evaluating.

9. A method according to claim 2, wherein the load imposed on the gear shifting lever and a moving distance of the gear shifting lever during the period from said first time point to said second time point are measured, so that the work load acting upon the gear shifting lever in the period from said first time point to said second time point is calculated based on data obtained by measurement of the load imposed on the gear shifting lever and the moving distance of the gear shifting lever as said calculated value, and the heaviness of the shifting operation of the gear shifting lever is evaluated on the strength of the work load calculated.

10. A method according to claim 1, wherein said calculated value is obtained based on the data obtained by at least measurement of the load imposed on the gear shifting lever in a period from a first time point at which spline teeth provided on the synchronizing sleeve commence to engage with spline teeth provided on the clutch gear to a second time point at which the spline teeth provided on the synchronizing sleeve complete to thrust through the spline teeth provided on the clutch gear, and the smoothness of the shifting operation of the gear shifting lever is evaluated on the strength of the calculated value.

11. A method according to claim 10, wherein impulse acting upon the gear shifting lever in the period from said first time point to said second time point is calculated as said calculated value, and the smoothness of the shifting operation of the gear shifting lever is evaluated on the strength of the impulse calculated.

12. A method according to claim 10, wherein the load imposed on the gear shifting lever and a moving distance of the gear shifting lever during the period from said first time point to said second time point are measured, so that work load acting upon the gear shifting lever in the period from said first time point to said second time point is calculated based on data obtained by measurement of the load acting to the gear shifting lever and the moving distance of the gear shifting lever as said calculated value, and the smoothness of the shifting operation of the gear shifting lever is evaluated on the strength of the work load calculated.

13. A method according to claim 10, wherein a positive ratio of change of the load imposed on the gear shifting lever during the period from said first time point to said second time point is calculated as said calculated value, and the smoothness of the shifting operation of the gear shifting lever is evaluated on the strength of the calculated positive ratio of change.

14. A method according to claim 10, where a rotating speed of the synchronizing sleeve and a rotating speed of the gear to synchronize are detected respectively so that a speed difference between the rotating speed of the synchronizing sleeve and the rotating speed of the gear to synchronize in the period from said first time point to said second time point is calculated and synchronizing performance of the synchromesh device is evaluated on the basis of the calculated speed difference in advance of evaluation about the smoothness of the shifting operation of the gear shifting lever in the step of evaluating.

15. A method according to claim 1, wherein a minimum value of the load imposed on the gear shifting lever during a first period from a first time point at which spline teeth provided on the synchronizing sleeve complete to thrust through spline teeth provided on the synchronizer ring to a second time point at which the spline teeth provided on the synchronizing sleeve commence to engage with spline teeth provided on the clutch gear and a maximum value of the load imposed on the gear shifting lever during a second period from said second time point to a third time point at which the spline teeth provided on the synchronizing sleeve complete to thrust through the spline teeth provided on the clutch gear, are detected based on the data obtained by measurement of the load imposed on the gear shifting lever, so that a difference between the detected minimum and maximum values of the load, and the smoothness of the shifting operation of the gear shifting lever is evaluated on the strength of the difference calculated.

16. An apparatus for evaluating a feeling of a gear shifting operation in a manual transmission which is provided with a shifting lever and a synchromesh device, comprising:
shifting means for moving the gear shifting lever to perform the shifting operation,
operation detection means for detecting an operation state of the gear shifting lever moved by said shifting means, and
calculating means for calculating a value representing quantitatively the feeling of the gear shifting operation in the manual transmission based on detection output obtained from the operation detecting means.

17. An apparatus according to claim 16, wherein said operation detecting means comprises load detecting means for detecting load imposed on the gear shifting lever in a predetermined period in the gear shifting operation, and distance detecting means for detecting a moving distance of the gear shifting lever in a predetermined period in the gear shifting operation.

18. An apparatus according to claim 17, wherein said calculating means calculating at least one of impulse and work load acting upon the gear shifting lever in the gear shifting operation base on at least one of detection outputs of the load detecting means and distance detecting means.

19. An apparatus according to claim 16 further comprising memory means for storing the value obtained from the calculating means and supplying the value stored therein for evaluation of the feeling of the gear shifting operation in the manual transmission.

* * * * *